May 1, 1945.  M. L. TAYLOR  2,375,146
PROTECTIVE MEANS
Filed Oct. 9, 1941
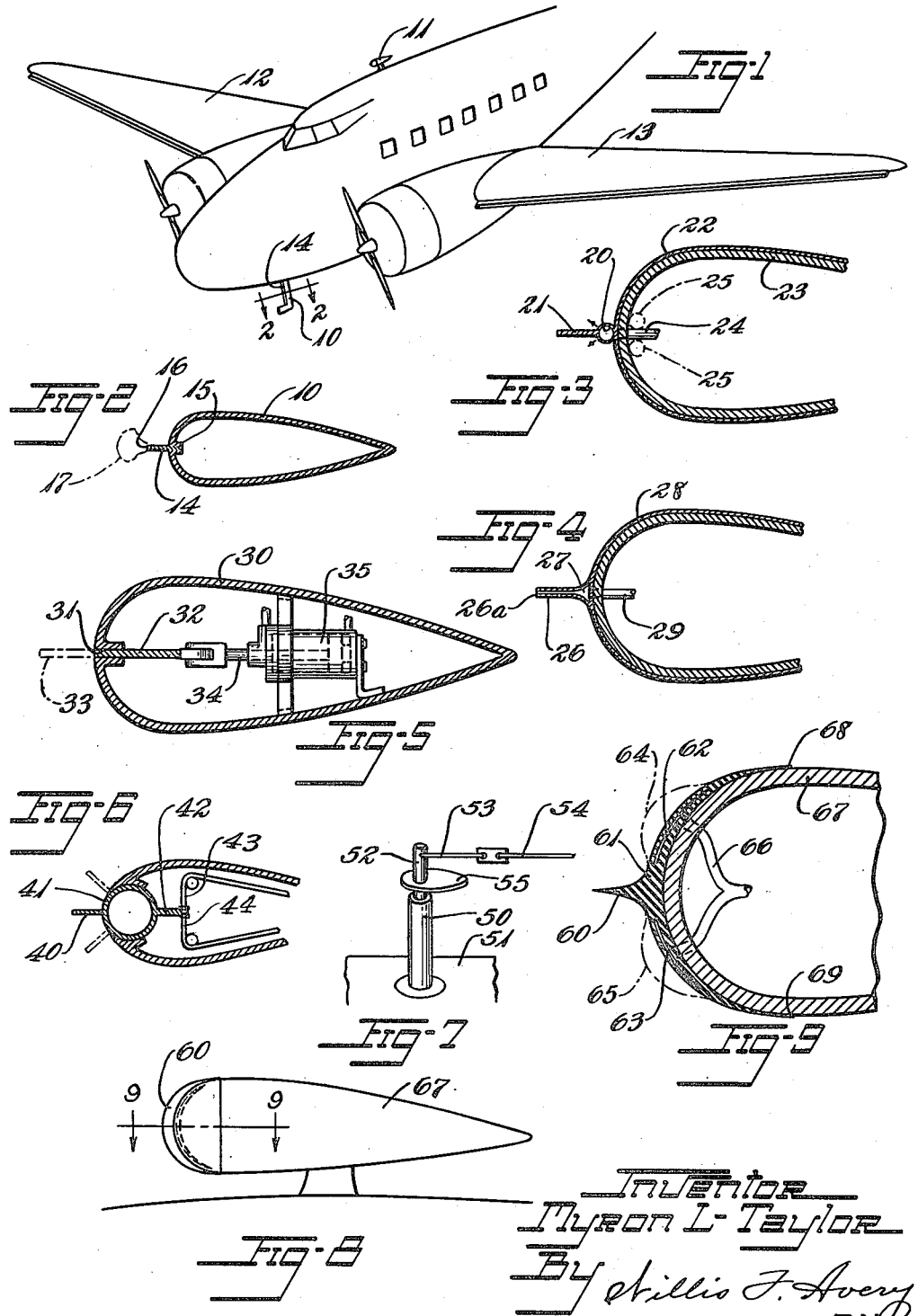
Inventor
Myron L. Taylor
By Willis F. Avery
Atty.

Patented May 1, 1945

2,375,146

UNITED STATES PATENT OFFICE 2,375,146

PROTECTIVE MEANS

Myron L. Taylor, West Englewood, N. J., assignor to The B. F. Goodrich Company, New York, N. Y., a corporation of New York Application October 9, 1941, Serial No. 414,260

8 Claims. (Cl. 244—134)

This invention relates to means for protecting structures from ice accumulation. The invention is useful especially for the protection of elements of aircraft from ice accumulation, including masts, struts, housings for radio compass loops, stabilizers, wings, and other airfoils and surfaces.

The invention utilizes advantageously the phenomenon that the ice tends to accumulate at the leading edge of an element disposed in a flow of air under icing conditions and usually builds up in the forward direction, into the direction of air flow.

A chief object of the invention is to provide an unstable seat for the ice in advance of the leading edge or other protected surface so that the ice will be deposited upon such seat preferentially, rather than upon the leading edge itself, and owing to the instability, the ice deposit, when it has accumulated sufficiently, will be dislodged by the air flow. Further objects are to provide for dividing an ice cap, in the event such cap is formed upon the leading edge of the element, to facilitate removal of the ice; to provide these results with a minimum of increase in aerodynamic drag; to provide a fin for the purpose together with means for moving the fin with relation to the surface of the element.

A further and more specific object is to provide for combining a fin construction for ice removal with other means of ice removal to augment the same.

These and further objects will be apparent from the following description, reference being had to the accompanying drawing in which:

Fig. 1 is a perspective view of an airplane having elements thereof constructed according to and embodying the invention.

Fig. 2 is a section taken along the line 2—2 of Fig. 1.

Fig. 3 is a cross section of the leading edge of an aircraft element including a modified form of the invention.

Fig. 4 is a view like Fig. 3 showing a still further modified form of the invention.

Fig. 5 is a cross section of an aircraft element embodying a further modified form of the invention.

Fig. 6 is a view like Fig. 3 showing a still further modified form of the invention.

Fig. 7 is a perspective view of a mast for a radio antenna, embodying the invention.

Fig. 8 is a side view of a housing for a radio compass loop, said housing embodying the invention.

Fig. 9 is a section taken along the line 9—9 of Fig. 8.

The invention is useful on the leading edges of many elements of the aircraft, which elements may include, by way of example, with reference to Fig. 1, a Pitot mast 10, a housing 11 for a radio compass loop, wings 12 and 13, the various elements of the tail group (not shown), and struts and the like (not shown).

In Fig. 2 the invention is shown as applied to the leading edge of the pitot supporting strut 10. At the leading edge of such strut is provided a fin 14 extending along the strut and projecting forwardly thereof, the fin being secured to the strut in any suitable manner such, for example, as an inset disposition of the rear margin of the fin and by a welded connection 15. The fin is of thin, preferably stiff metal or other suitable material presenting a narrow or even sharp frontal edge 16 to provide an unstable seat for gathering ice, and preferably capable of some vibration to facilitate ice removal. Also, it is desirable that the material of the fin at its surface be such as to have the characteristic of poor adhesive power with relation to ice. Such ice may accumulate upon the seat 16, for example, in the manner of the broken lines 17 until a sufficient mass of the ice accumulates to lose stability readily, whereupon any slight unbalance in force on the ice, resulting, for example, from a shift in the air flow, or from vibration of the fin, or both, will cause the ice to be dislodged and pass away in the air flow. I have found that good results may be obtained by extending the fin forwardly about one half of an inch or in some cases three-eighths from the leading edge, it being desirable to keep the frontal surface of the fin within the stagnation zone in front of the leading edge. For narrow elements, such as the strut 10, this fin ordinarily will be sufficient to give ample protection from ice accumulation. On wider elements, even though ice is deposited at the sides of the fin as well as upon its frontal surface, the fin acts to divide the ice cap for easier removal.

However, for elements of greater width some accumulation of ice may occur in areas of the element to the sides of the fin, in which case auxiliary means may be provided to protect the areas not protected by the fin. Also, auxiliary means may be provided to augment the ice-removing action at the fin.

Such auxiliary means may comprise conducting means for anti-icing liquid, such, for example, as the tube 20, shown in Fig. 3, at the base of the fin 21, which tube may be associated with a mounting sheath or strap 22 of metal, fabric, rubber or other material upon the surface of the element 23 and extending about the element, where desired, or adhered to it or otherwise suitably attached. A conduit 24 supplies the anti-icing liquid to the tube 20, and the tube is apertured along its length to discharge fluid upon the fin and also upon the adjoining surfaces of the element. The anti-icing liquid resists depositing of ice and, in the event ice is deposited, it serves to weaken the hold of the ice so that the ice will be more readily dislodged from the fin, especially in cases where some ice is formed upon the sides of the fin or upon the element or both, as well as upon the unstable frontal seat of the fin. Thus, the unstable seat, and the stiffly flexibly nature of the fin, and the action of the fin in dividing an ice cap, act in combination with the anti-icing liquid to protect the element from ice accumulation.

If desired, as an alternative or as an auxiliary arrangement, fluid-distributing tubes indicated in broken lines at 25, 25 in Fig. 3 may be provided in the interior of the element 23, the wall 23 of the element at the leading edge being suitable apertured to permit passage from the pipes 25, 25 to the outer surface of the leading edge and to the fin.

Heat may be applied to the fin, as an auxiliary action to the anti-icing liquid, or as an alternative to facilitate the ice removal, and this may be effected, for example, by feeding heated air or other fluid through the pipes 20 or 25, or by electrical heating elements in the vicinity of the fin or incorporated therewith as desired. The fin itself may comprise electrically resistance material so as to be heated by an electrical current, and the fin may be insulated from the element and suitable electrical connections may be provided for the purpose.

With reference to the embodiment of Fig. 4, the fin, designated 26, may have one or more passages 27 through to its frontal surface 26a for discharge of the anti-icing fluid at the frontal surface for more effective application of an anti-icing fluid at such frontal surface. In this embodiment the anti-icing fluid will serve its purpose to loosen ice at the frontal surface and will creep on back along the surface of the fin and of the element to be effective also at these surfaces. As in the case of the previous embodiment the fin may be associated with a sheath or strap 28 which may be applied over the element, and a conduit 29 may be provided for feeding the anti-icing liquid to the passages of the fin.

With reference to the embodiment of Fig. 5, provision is made for retracting the fin into the element when icing conditions are not present and to scrape off ice by the retraction, and for any other circumstance. In this embodiment the element 30, which may be an airfoil, strut, or other aircraft element, is provided with a slot 31 at its leading edge through which a fin 32 may be extended to the position of the broken lines 33. The fin is operated at its rear margin by one or more rods 34 which may be manipulated, as by a piston within a fluid pressure cylinder 35, to move the fin back and forth. The fluid pressure cylinder 35 may have suitable connections to the pilots cockpit for controlling operations of the fin.

In some cases, as where the fin is used at the leading edge of a wing or other airfoil, it may be desirable to provide for shifting the fin to maintain its frontal surface at the most effective position despite changes in the angle of attack of the airfoil. With reference to Fig. 6 this may be effected as by mounting the fin 40 for pivotal movement at 41 within the leading edge of the element and providing a rearward extension 42 of the fin for controlling the pivotal movement, as by cables 43, 44 mounted within the airfoil and leading to suitable control points. For a wide range of movement, the pivot 41 may be in the form of a cylinder mounted in the leading edge of the airfoil as shown, the fin being shiftable between the extreme position indicated by broken lines. The cylinder is applicable especially to airfoils, the leading edges of which are designed of substantially cylindrical form, including truncated conical forms.

If desired, the action of the fin may be augmented by imposed vibrations, whether by the vibrations of the aircraft, or by manual vibrations or by the application of any suitable vibrating device.

In Fig. 7 is illustrated an application of the invention for the protection of a mast for a radio antenna. The mast may comprise, for example, a tubular support 50 suitably mounted on the aircraft 51 and having an upward extension 52 secured to the support 50, to which extension a supporting wire 53 of the antenna 54 may be attached. In severe icing conditions the ice at times so covers the parts above-described as to short circuit the aerial 54 with the structure 51. In accordance with the invention I provide a disk-like fin 55 mounted preferably upon the insulated portion 52 of the mast and projecting outwardly therefrom to provide a narrow frontal seat upon which ice will deposit preferentially and by its dividing action greatly increase the difficulty for the ice to form continuously and complete a short circuiting bridge across the parts. Preferably the disk 55 is elongated in the direction of the air flow for advancing the frontal seat well into the air flow so that the ice deposited thereon will be remote from the mast, while other surfaces of the disk, which are not so vulnerable to ice accumulation, may be less distant from the mast. As in the case of the previously described embodiment the disk 55 presents an unstable seat for the ice so that the latter will be dislodged upon attaining a mass sufficient to respond to the dislodging forces.

In the embodiment of Figs. 8 and 9 a fin 60 is provided as a forward extension of a shoe 61 having hollow portions 62, 63 adapted for distortion to positions indicated by the broken lines 64, 65. The shoe may be constructed of resilient rubber-like material reinforced as by fabric, and the distortion may be effected by inflation through a conduit 66 in a manner, for example, as is disclosed in Geer Patent No. 1,998,809. The shoe is mounted upon the leading edge of an element 67 as by adhesion thereto or by attachment at its rear margins 68, 69, or both. The fin 60 may be forwardly tapered in cross section as shown to provide a broad base for the desired degree of stiffness, and a narrow frontal surface to provide an unstable seat for ice accumulation. Ice deposited upon the surfaces at the side of the fin 60 may be broken up by intermittent inflation of the portion 62, 63, and in the case of heavy ice deposits the fin 60 serves also as a divider for the ice to facilitate the action of the inflatable portions in breaking up the deposit. This embodiment of the invention is useful especially upon aircraft elements of considerable thickness of the leading edge, and in Fig. 8 it is shown as applied to the leading edge of a housing 67 for a radio compass loop in which application the shoe is curved in two directions to conform to the nose of the housing and the fin 60 is tapered toward its extremities in half moon shape as seen from the side in Fig. 8.

With reference to all the embodiments hereinabove discussed one of the advantages of the fin lies in its function of effecting division of ice deposit which otherwise would form a natural lock difficult to break. The dividing action of the fin as well as the function of the fin in providing an unstable seat may if desired be augmented by auxiliary means for minimizing adhesion, including the use of anti-icing liquids, adhesion-reducing substances or heat, individually or in combination.

Variations may be made without departing from the scope of the invention as it is defined in the following claims.

I claim:

1. Means for protecting an element from ice accumulation, said means comprising a fin extending along and secured throughout its length to said element and projecting forwardly therefrom, said fin throughout a substantial portion of its projection being of such thinness in relation to the stiffness of its material as to be unstable in the airflow when retaining ice and having a frontal surface of such small dimension as to provide an unstable advance seat for ice.

2. Protecting means as defined in claim 1 comprising means for depositing anti-freeze liquid upon the fin.

3. Protecting means as defined in claim 1 in which means is provided on said element for applying heat at said fin.

4. Means for protecting the leading edge of an aircraft element from ice accumulation, said means comprising a fin extending along and secured throughout its length to said leading edge and projecting forwardly thereof, said fin throughout a substantial portion of its projection being of substantially uniform thickness and presenting a narrow frontal surface spaced from said leading edge to provide an unstable advance seat for ice.

5. Protecting means as defined in claim 4 in which means is provided for depositing antifreeze liquid upon said fin.

6. Protecting means as defined in claim 4 in which said fin is provided with passages therethrough to said frontal surface for conducting anti-freeze liquid to such surface.

7. Means for protecting the leading edge of an aircraft element from ice accumulation, said means comprising a shoe comprising rubber-like material adapted to be mounted at the leading edge of an element, said shoe having a fin projecting forwardly thereof and presenting a narrow frontal surface providing an unstable advance seat for ice.

8. Means for protecting the leading edge of an aircraft element from ice accumulation, said means comprising a shoe comprising rubber-like material adapted to be mounted upon the leading edge of said element, said shoe comprising portions adapted to be distorted outwardly from the leading edge, a fin disposed between said portions and projecting forwardly thereof and presenting a narrow frontal surface to provide an unstable advance seat for ice.

MYRON L. TAYLOR.